(12) United States Patent
Maruno et al.

(10) Patent No.: US 12,206,831 B2
(45) Date of Patent: Jan. 21, 2025

(54) VERIFICATION METHOD FOR CALIBRATION OF CAMERA, CALIBRATION VERIFICATION PROGRAM AND CALIBRATION VERIFICATION APPARATUS

(71) Applicant: DENSO CORPORATION, Kariya (JP)

(72) Inventors: Hiroaki Maruno, Kariya (JP); Kenji Okano, Kariya (JP); Hirofumi Takasuka, Kariya (JP); Atsushi Yoshihara, Kariya (JP)

(73) Assignee: DENSO CORPORATION, Kariya (JP)

( * ) Notice: Subject to any disclaimer, the term of this patent is extended or adjusted under 35 U.S.C. 154(b) by 54 days.

(21) Appl. No.: 18/323,256

(22) Filed: May 24, 2023

(65) Prior Publication Data

US 2023/0388477 A1    Nov. 30, 2023

(30) Foreign Application Priority Data

May 27, 2022 (JP) .................................. 2022-087185

(51) Int. Cl.
  *H04N 13/246* (2018.01)
  *G06T 7/80* (2017.01)
(52) U.S. Cl.
  CPC ............. *H04N 13/246* (2018.05); *G06T 7/80* (2017.01)

(58) Field of Classification Search
  None
  See application file for complete search history.

(56) References Cited

U.S. PATENT DOCUMENTS

2015/0254853 A1    9/2015   Tanaka et al.

FOREIGN PATENT DOCUMENTS

JP       4690476 B2      2/2011
JP       2019129341 A  * 8/2019

* cited by examiner

*Primary Examiner* — Christopher Braniff
(74) *Attorney, Agent, or Firm* — Maschoff Brennan

(57) ABSTRACT

A calibration verification method for verifying a calibration result of a camera mounted to a vehicle includes: an image acquiring step for acquiring an image captured by a camera; an overlay position calculation step for calculating a display position of a required accuracy range based on positional information of a verification target and a required accuracy of the camera; an overlay image generation step for generating an overlay image indicating a display position of the required accuracy range, and causing a display device to display a verification image where the overlay image is overlaid on the image captured by the camera; and a determination step for determining that the calibration result of the camera satisfies the required accuracy of the camera.

9 Claims, 13 Drawing Sheets ns VERIFICATION METHOD FOR CALIBRATION OF CAMERA, CALIBRATION VERIFICATION PROGRAM AND CALIBRATION VERIFICATION APPARATUS

CROSS-REFERENCE TO RELATED APPLICATION

This application is based on and claims the benefit of priority from earlier Japanese Patent Application No. 2022-087185 filed May 27, 2022, the description of which is incorporated herein by reference.

BACKGROUND

Technical Field

The present disclosure relates to a technique for verifying a calibration result of a camera mounted to a vehicle.

Description of the Related Art

Generally, a vehicle vicinity monitoring or a driving assist operation are executed in accordance with images around the vehicle captured by a camera mounted to the vehicle. In order to appropriately execute the vehicle vicinity monitoring and the driving assist operation, a coordinate system of the image captured by the camera and a coordinate system used for an image processing are required to be accurate and consistent. In order to secure the accuracy and consistency between the coordinate systems, the camera is required to be calibrated. The calibration result of the camera is verified. Hence, appropriate calibration is accomplished.

SUMMARY

The present disclosure provides a calibration verification method for verifying a calibration result of a camera mounted to a vehicle.

The calibration verification method for verifying a calibration result of a camera mounted to a vehicle includes steps of: an image acquiring step for acquiring an image captured by a camera, the image showing a state where verification targets each including one or more markers added to a portion thereof at a predetermined height are arranged around the vehicle; an overlay position calculation step for calculating a display position of a required accuracy range based on positional information of the verification target and a required accuracy of the camera, the required accuracy range indicating a required accuracy of the camera corresponding to a height of the marker; an overlay image generation step for generating an overlay image indicating a display position of the required accuracy range, and causing a display device to display a verification image where the overlay image is overlaid on the image captured by the camera; and a determination step for determining that the calibration result of the camera satisfies the required accuracy of the camera when the marker of the verification target is displayed within the required accuracy range in the verification image.

DETAILED DESCRIPTION OF THE PREFERRED EMBODIMENTS

Generally, a vehicle vicinity monitoring or a driving assist operation are executed in accordance with images around the vehicle captured by a camera mounted to the vehicle. In order to appropriately execute the vehicle vicinity monitoring and the driving assist operation, a coordinate system of the image captured by the camera and a coordinate system used for an image processing are required to be accurate and consistent. In order to secure the accuracy and consistency between the coordinate systems, the camera is required to be calibrated. The calibration result of the camera is verified. Hence, appropriate calibration is accomplished.

As a related art, for example, Japanese patent number 4690476 discloses a method for calibrating camera in which a camera captures an image of a rectangular calibration marker having a checked pattern disposed at front-rear and left-right portions of a vehicle, thereby calibrating an on-vehicle camera. The coordinate of the outline of the marker showing a theoretical position of the calibration marker is calculated using a camera parameter after the calibration and the marker outline is overlayed on the captured marker image displayed on a display unit. The calibration marker is appropriately displayed on the marker outline when an appropriate camera calibration is successively performed.

According to the method of the above-described patent literature, in the case where the position of the calibration marker is shifted from the correct position, even when the camera calibration is successively performed, the calibration marker is displayed within the marker outline. That is, even if the camera calibration is inappropriate, the calibration marker is possibly displayed within the marker outline. In this case, an operator of the calibration does not notice the shift of the calibration marker and may erroneously recognize the calibration result.

With reference to the drawings, embodiments of the present disclosure will be described.

First Embodiment

Figure 1:
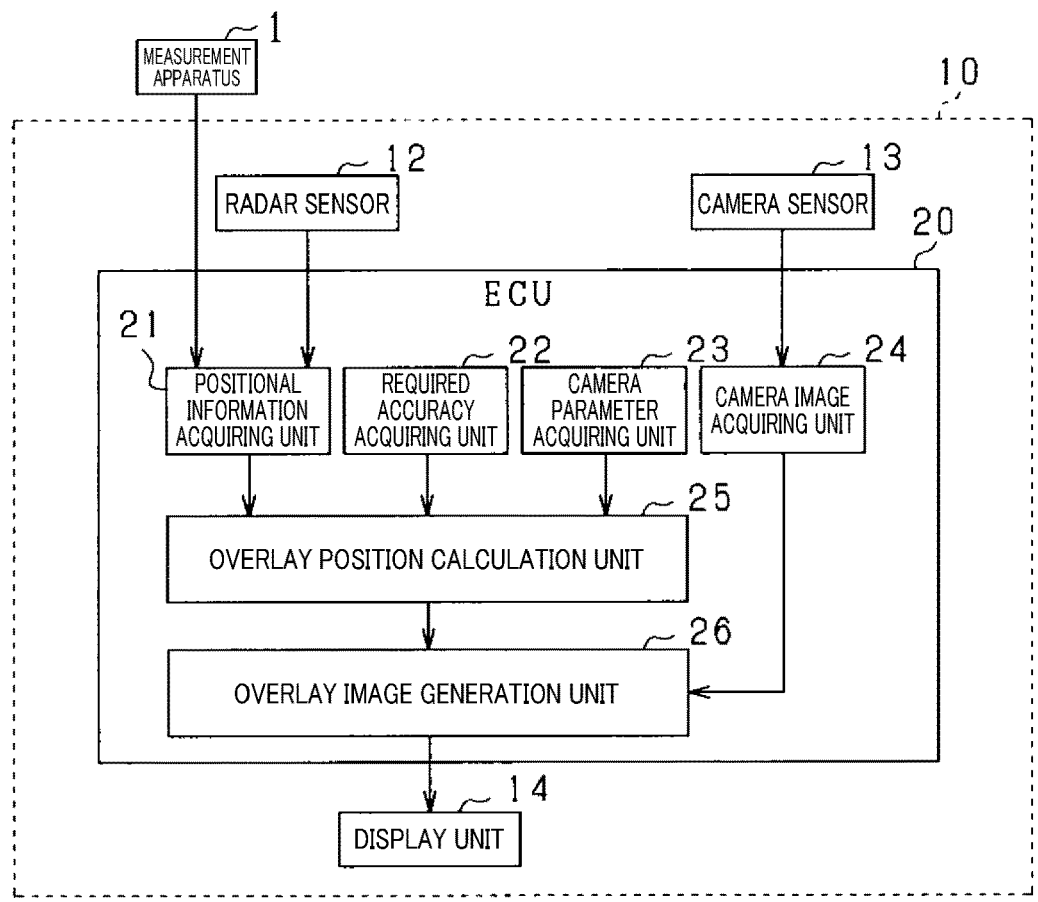
FIG. 1 is a block diagram showing a configuration of a calibration verification apparatus according to a first embodiment of the present disclosure.

FIG. 1 shown a vehicle provided with an ECU 20 serving as a calibration verification apparatus according to the first embodiment. The vehicle 10 is provided with a radar sensor 12, a camera sensor 13, an ECU (electronic control unit) and a display device 14 as an on-vehicle system.

The radar sensor 12 is, for example, a known millimeter radar apparatus of which the transmission waves are in the millimeter wave band. Note that only one radar sensor 12 may be provided in the vehicle 10 or a plurality of radar sensors may be provided in the vehicle 10. The radar sensor 12 is provided in a front end part and a rear end part of the vehicle 10 for example, and has a detection range capable of detecting objects as a region defined within a predetermined detection angle. Specifically, the radar sensor 12 transmits radar waves at predetermined periods and receives reflection waves with a plurality of antennas. A distance between the radar sensor 12 and the object can be calculated using the transmission time of the radar waves and the reception time of the reflection waves. Further, a relative speed is calculated with a frequency changed by Doppler effect based on the reflection waves reflected at an object. Also, an azimuth of the object can be calculated using a phase difference of the reflection waves received by the plurality of antennas. Note that a relative location of the object with respect to the vehicle 10 can be identified if the location and the azimuth of the object is calculated.

The camera sensor 13 may be a single-lens camera such as a CCD camera, a CMOS image sensor, and a near-infrared camera, or a stereo camera. The camera sensor 13 extracts feature points indicating a presence of objects in a captured image. Specifically, edge points are extracted based on luminance information of the captured image, and Hough transformation is performed for the extracted edge points. In the Hough transformation, for example, points on a straight line along which a plurality of edge points are continuously arranged or points at which straight lines cross with each other are extracted as feature points. The camera sensor 13 successively outputs images successively captured to be sensing information.

Figure 2:
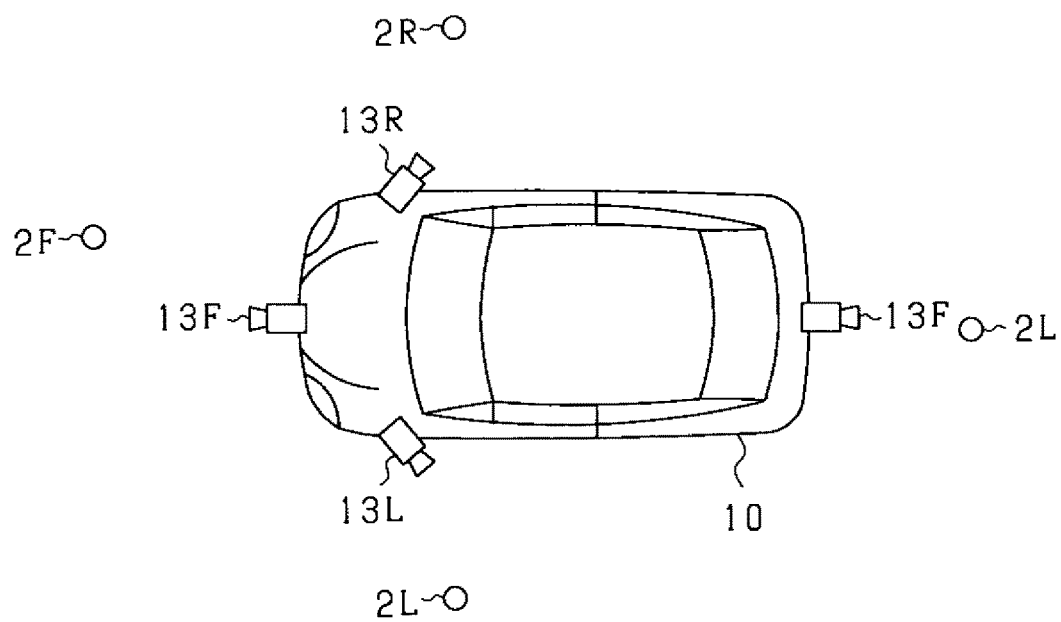
FIG. 2 is a diagram showing a camera sensor mounted to a vehicle and a verification target provided in the vicinity of the vehicle.

For the camera sensor 13, one camera 13 may be provided in the vehicle 10 or a plurality of camera sensors 13 may be provided in the vehicle 10. The camera sensor 13 is disposed in a center portion with respect to the vehicle width direction of the vehicle 10 at a predetermined height, capturing, as a bird's-eye view, an image of a region spreading in a predetermined angle range towards a vehicle front side, a vehicle rear side or a lateral direction side. For example, similar to the camera sensors 13F, 13L, 13R and 13B shown in FIG. 2, the camera sensor 13 may be disposed in a front side, a left side, a right side and rear side.

After calibrating the camera 13, in order to verify the calibration result, verification targets 2 are appropriately disposed around the vehicle 10 and the verification targets 2 are captured by the camera 13. The verification targets 2 are appropriately disposed around the vehicle 10 depending on the position and the orientation of a portion at which the camera 13 is disposed. The position of the verification targets 2 may be in a capturing range of the camera sensor 13. In the case where the camera sensors 13F, 13L. 13R and 13B are calibrated, for example, similar to the verification targets 2F, 2L, 2R and 2B, the verification targets 2 may preferably be disposed in the front side, left side, right side and rear side of the vehicle 10 in a direction towards the camera sensor 13.

The display device 14 is provided with at least a display screen on which a image captured by the camera 13 is displayed. For example, the display device 14 may be a display screen of a car navigation system. The display device 14 may be provided with an interface unit capable of accepting an operation command of an operator while viewing the display screen.

As shown in FIG. 1, the ECU 20 is provided with a positional information acquiring unit 21, an accuracy acquiring unit 22, a camera parameter acquiring unit 23, a camera image acquiring unit 24 and an overlay position calculation unit 25 and an overlay image generation unit 26. The ECU 20 is configured as a computer (i.e. microprocessor) provided with CPU, ROM, RAM and input-output interface and the like. The CPU is configured to execute programs stored in the ROM and RAM, thereby serving as the above function units shown in FIG. 1. Thus, the ECU 20 serves as a calibration verification apparatus that displays a verification image for verifying the calibration result of the camera sensor 13 on the display device 14.

The positional information acquiring unit 21 acquires positional information of the verification target 2. The positional information of the verification target 2 may be measured by a predetermined measurement apparatus or may be received via a communication apparatus or an operator inputs the positional information. FIG. 1 exemplifies a case where the positional information acquiring unit 21 acquires positional information of the verification target 2 from the on-vehicle radar sensor 12, a measurement apparatus 1 provided outside the vehicle. The radar sensor 12 is an example of an on-vehicle sensor other than the camera sensor 13, capable of acquiring positional information of verification target 2. The vehicle 100 may include such an on-vehicle sensor, for example, sensors that emit probe waves such as a sonar sensor, a LIDAR (light detection and ranging/laser imaging detection and ranging). The measurement apparatus 1 is, for example, a measurement apparatus such as a laser range finder, a measure, a ruler and the like. The positional information of the verification target 2 measured by the measurement apparatus 1 may be transmitted to the ECU 20 via a communication means or an operator may input it to the ECU 20. The positional information of the verification target 2 acquired by the positional information acquiring unit 21 is transmitted to the overlay position calculation unit 25.

The accuracy acquiring unit 22 acquires a required accuracy required for the camera sensor 13. The required accuracy is set depending on the distance from the camera sensor 13 and set as an allowable error range in a front, rear, left and right sides depending on the distance, for example. The required accuracy is set such that the closer to the camera 13, the higher the accuracy. For example, when the distance from the camera sensor 13 is 100 m, the required accuracy is 1.3 m in the front and rear (longitudinal sides), left and right sides (lateral sides), and when the distance from the camera sensor 13 is 10 meters, the required accuracy is 1.3 cm. The required accuracy acquired by the accuracy acquiring unit 22 is transmitted to the overlay position calculation unit 25.

The camera parameter acquiring unit 23 acquires a camera parameter of the camera sensor 13. The camera parameter refers to, for example, a mounting position of the camera sensor 13 relative to the vehicle 10, a direction of the optical axis of the camera sensor 13. A camera calibration process refers to a process for adjusting a camera parameter to be in an appropriate range. The camera parameter of the camera sensor 13 acquired by the camera parameter acquiring unit 23 is transmitted to the overlay position calculation unit 25.

The camera image accruing unit 24 acquires an image in which the camera sensor 13 captures a state of the verification targets 2 disposed around the vehicle 10. The captured image acquired by the camera image acquiring unit 24 is transmitted to the overlay image generation unit 26.

Figure 3:
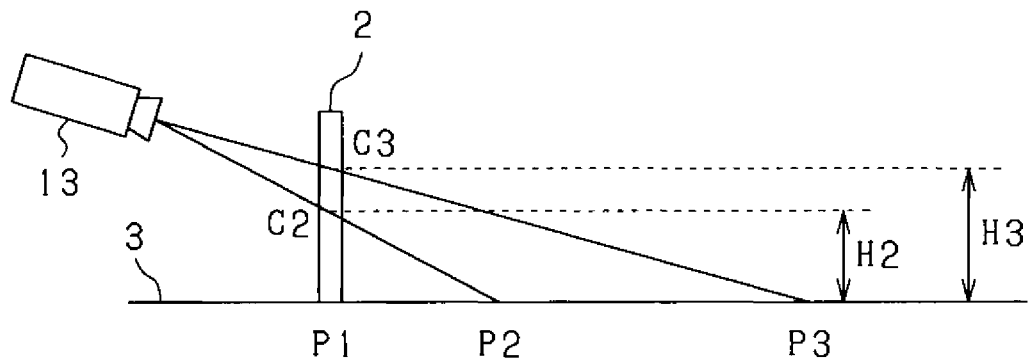
FIG. 3 is a diagram showing a required accuracy range.
Figure 4A:
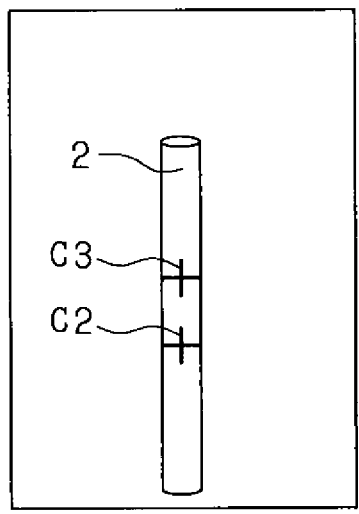
FIGS. 4A to 4C are diagrams showing a generation process of overlay images in which a captured image and a required accuracy range are shown.

The verification target 2 is used for verifying the verification result of the camera sensor 13. As shown in FIG. 3 and FIG. 4A, the verification target 2 is formed in a column shape (i.e. cylindrical shape) in which one or more markers are added to a portion at a predetermined height position. In the verification target 2, a marker C2 is added to a portion thereof at a height H2 from the ground, and a marker C3 is added to a portion at a height H4 from the ground 3. The markers C2 and C3 are each formed in a cross shape and the centers thereof are positioned at the height H2 and H3, respectively. As shown in FIG. 3, in the case where a position P1 is defined as a position where the verification target 2 is disposed, the marker C2 is added to a portion at a height H2 as a cross point between a line connecting the camera sensor 13 and the position P2, and the verification target 2, the marker C3 is added to a portion at a height H3 as a cross point between a line connecting the camera sensor 13 and the position P3, and the verification target 2. The height H2 and H3 of the markers C2 and C4 may be adjusted depending on the required accuracy, or the required accuracy may be converted depending on the height H2 and H3 of the markers C2 and C3.

The overlay position calculation unit 25 calculates, based on the positional information of the verification target 2 outputted from the positional information acquiring unit 21 and the required accuracy outputted from the accuracy acquiring unit 22, display positions of the required accuracy range R2 and R2 indicating the required accuracy of the camera sensor 13 corresponding to the height of the markers C1 and C2. The overlay position calculation unit 25 further calculates the required accuracy range R1 corresponding to the lowest position of the verification target 2 (position of the ground 3). The overlay position calculation unit 25 calculates the positions of the required accuracy ranges R1, R2 and R3 in order to generate the overlay image shown in FIG. 4B. The positions of the required accuracy ranges R1, R2 and R3 are outputted to the overlay image generation unit 26.

The required accuracy range R1 to R3 refers to a range where the lowest portion and the markers C2 and C3 of the verification target 2 are present in the verification image when the verification result of the camera sensor 13 is appropriate (i.e. a case where the camera sensor 13 is calibrated to satisfy the required accuracy). The required accuracy range R1 is calculated to be in a predetermined range with respect to the ground 3 which is height 0, depending on the required accuracy corresponding to the position P1. The required accuracy range R2 is calculated to be in a predetermined range with respect to the marker C2 which is height H2, depending on the required accuracy corresponding to the position P2. The required accuracy range R3 is calculated to be in a predetermined range with respect to the marker C3 which is height H3, depending on the required accuracy corresponding to the position P3.

Figure 4B:
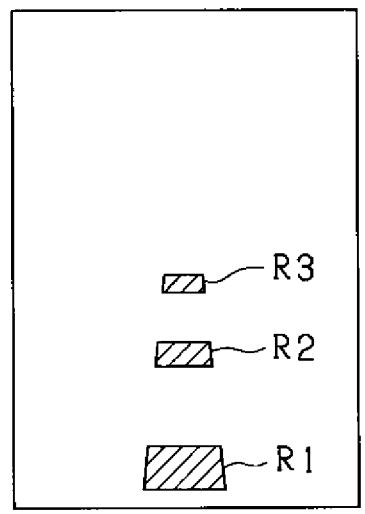
Figure 4C:
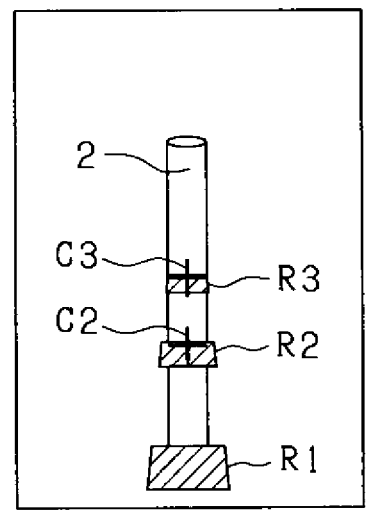

The overlay image generation unit 26 generates an overlay image indicating the required accuracy range R1 to R3, and overlays the generated overlay image on the camera image. The overlay image is an image in which the required accuracy range R1 to R3 can be visually recognized. The overlay image is generated based on the display position of the required accuracy range R1 to R3 calculated by the overlay position calculation unit 25. For example, as shown in FIG. 4B, the display positions of the required accuracy range R1 to R3 are marked, whereby an operator is able to visually recognize the required accuracy range R1 to R3. For a method for overlaying an overlay image on the camera image, an image synthesizing process such as a blend processing can be utilized. The a blend processing performs a semitransparent synthesis for two images using a coefficient (a value). An overlay image indicating the required accuracy range R1 to R3 shown in FIG. 4B is generated and the generated overlay image is overlayed on the captured image of the camera sensor 13 shown in FIG. 4A, whereby the verification image shown in FIG. 4C is generated.

The overlay image may be produced such that an overlay image is outputted to the display device 14 and the overlay image is overlayed on a camera image already displayed on the display device 14, thereby producing the overlay image. For example, when an overlay image shown in FIG. 4B is outputted to the display device 14 in a state where a camera image shown in FIG. 4A is displayed on the display device 14, a verification image shown in FIG. 4C may be displayed on the display device 14. Further, a verification image in which a camera image and an overlay image are overlayed may be generated in advance by the ECU 20, and the verification image may ne displayed on the display device 14. For example, the ECU may generate a verification image shown in FIG. 4C, outputs the generated verification image to the display device 14, and a verification image may be displayed on the display device 14.

Figure 5:
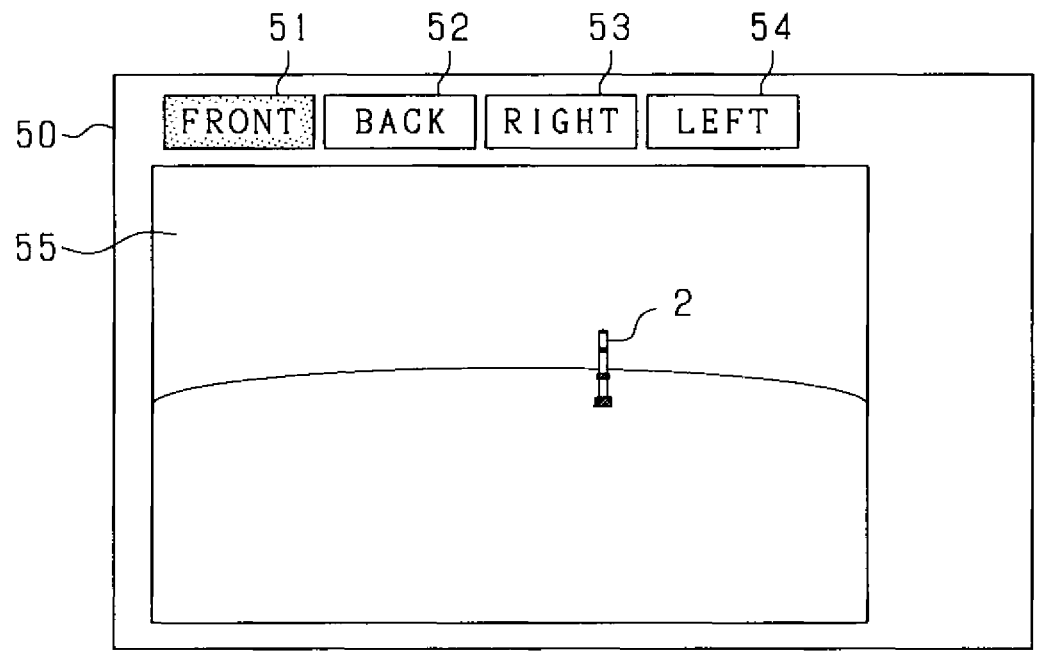
FIG. 5 is a diagram showing a display unit on which a verification image according to the first embodiment is displayed.
Figure 6:
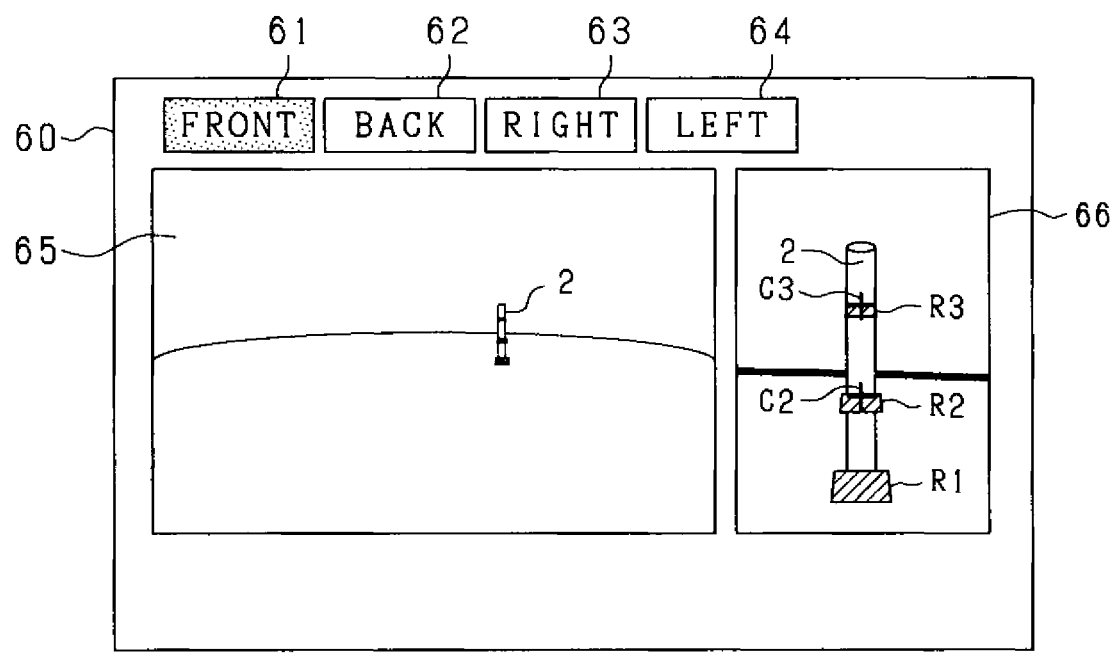
FIG. 6 is a diagram showing a display unit on which a verification image according to the first embodiment is displayed.

FIGS. 5 and 6 exemplifies a verification image displayed on a display screen of the display device 14. The display screen 50 shown in FIG. 5 includes a front display 51, a back display 52, a right display 53, a left display 54 which display the positions of the camera sensor 13, and a verification image 55 which displays a verification image. The front display 51 lights when the verification image display 55 corresponds to the camera sensor 13F. The back display 52 lights when the verification image display 55 corresponds to the camera sensor 13B. The right display 53 lights when the verification image display 55 corresponds to the camera sensor 13R. The left display 54 lights when the verification image display 55 corresponds to the camera sensor 13L. The respective displays 51 to 54 may simply indicate a correspondence with the verification image display 55 or may be provided with an input interface for changing the verification image display 55 with a touch panel function.

Further, an expanded image display 66 which expands a portion in the vicinity of the verification target 2 of the verification image display 65 may further be provided in addition to the respective displays 61 to 64 and the verification image display 65 like a display screen 60 shown in FIG. 6. Note that the respective displays 61 to 64 and the verification image display 65 are similar to the respective displays 51 to 54 and the verification image display 55 shown in FIG. 5.

Figure 7:
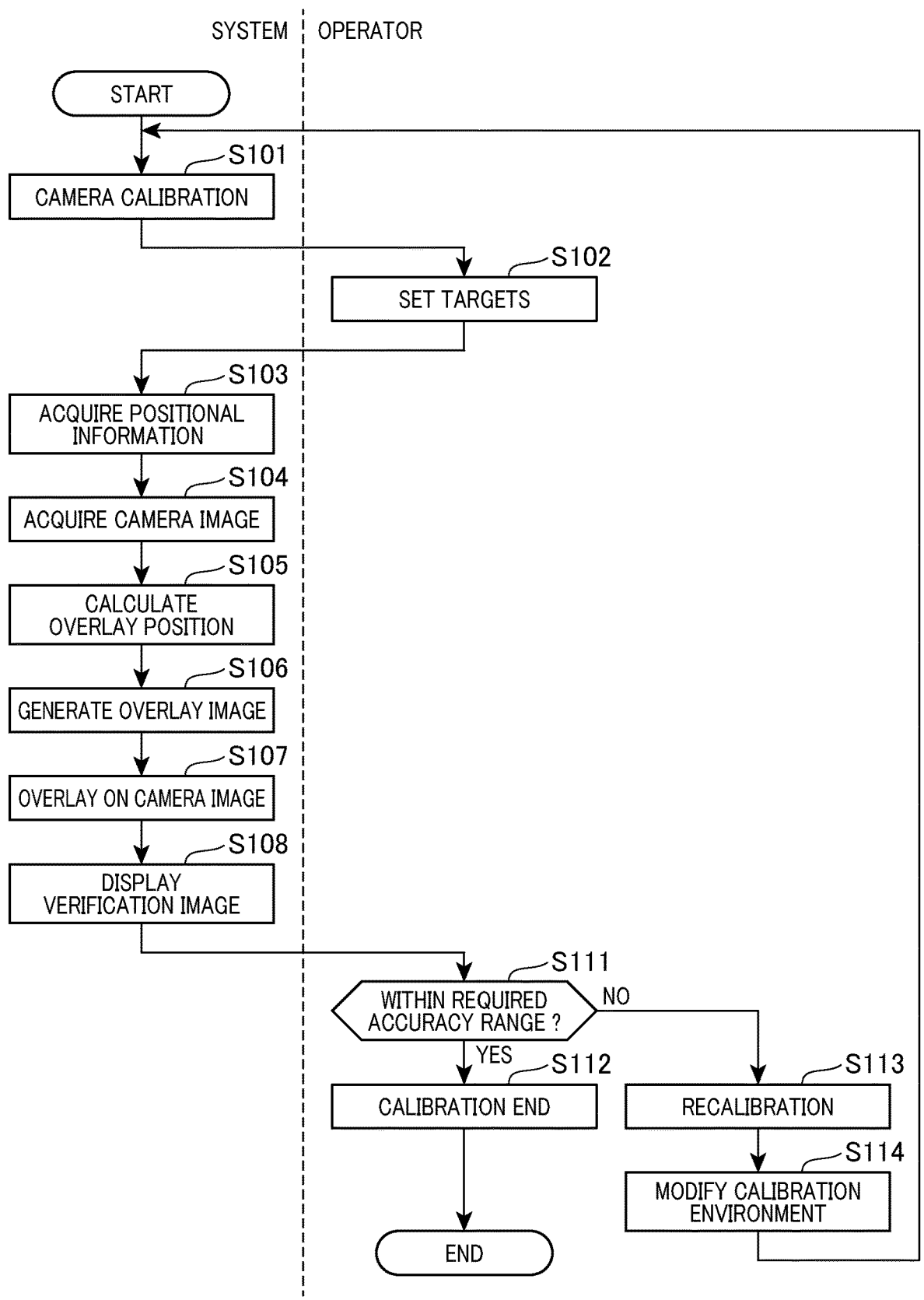
FIG. 7 is a flowchart showing a calibration verification method of a camera sensor according to the first embodiment.

FIG. 7 shows a flowchart of a calibration and a calibration verification method of the camera sensor 13 mounted to a vehicle 10. Specifically, the calibration and the calibration method is a method in which the calibration result is verified by a verification image generated by a verification image display apparatus after calibrating the camera sensor 13. In FIG. 7, the left side with respect to the dotted line shows a process executed in the on-vehicle system side in the vehicle 10, and the right side thereof shows a process executed by an operator.

At step S101, the on-vehicle system executes a process for calibrating the camera sensor 13. The method for calibrating the camera sensor 13 is not limited and various calibration methods may be used. In the present flow chart, the process for a camera calibration is in the system side, but the process for the camera may be executed by the operator.

The steps S102 to S114 show processes for the calibration verification method. At step S102, the operator disposes the verification target 2. According to the present embodiment, the operator disposes the verification target 2 at arbitrary positions.

The respective processes shown in steps S103 to S108 are executed by the on-vehicle system. At step S103, a process is executed for acquiring the positional information of the verification target 2 from the on-vehicle radar sensor 12 or the measurement apparatus 1 provided outside the vehicle. For example, the process acquires the positional information as a relative positional information between a position of the camera sensor 13 of the vehicle 10 and a position at which the verification target 2 is disposed (e.g. positional relationship in the longitudinal direction and in the lateral direction).

At step S104, a process for acquiring a camera image from the camera sensor 13 is executed. For example, the process acquires a camera image including the verification target 2 as shown in FIG. 4A.

At step S105, the process calculates display positions of the required accuracy range R1 to R3. The display positions of the required accuracy range R1 to R3 are calculated based on the position of the verification target 2 and the required accuracy of the camera sensor 13 corresponding to the height H2 and H3 of the markers C2 and C3. Hence, the display positions of the required accuracy range R1 to R3 can be prevented from being at an inappropriate position due to a positional shift of the verification target 2.

At step S106, the process generates an overlay image where the display positions of the required accuracy range R1 to R3 calculated at step S105, thereby generating the overlay image that displays the required accuracy range R1 to R3 as shown in FIG. 4B.

At step S107, the process overlays the overlay image generated at step S106 on the camera image acquired at step S104. Thus, as shown in the subsequent step S108, the verification image is displayed on the display device 14. The overlay image generated at step S106 is overlayed on the camera image displayed on the display device 14, whereby the verification image shown in FIG. 4C is displayed on the display device 14. More specifically, the verification image is displayed on the display device 14 like the verification images 55 and 65 and the expanded image display 66 shown in FIGS. 5 and 6. Thereafter, the process proceeds to step S111.

The respective steps S111 to S114 are executed by the operator. At step S111, the operator visually observes the verification image displayed on the display screen of the display device 14, thereby confirming whether the accuracy of the camera sensor 13 is in the required accuracy range. Specifically, for example, the operator visually observes the expanded image display 66 shown in FIG. 6 and determines that the accuracy of the camera sensor 13 is in the required accuracy range when the lowest portion, the marker C2 and the marker C3 of the verification target 2 are positioned in the corresponding required accuracy range R1, R2 and R3. Then, the process proceeds to step S112 and terminates the calibration process of the camera sensor 13.

In the case where any one of the lowest portion, the marking C2 and the marking C3 of the verification target 2 is positioned outside the range corresponding required accuracy range R1, R2 and R3, the process determines that the accuracy of the camera sensor 13 is not in the required accuracy range and proceeds to step S113. At step S113, the process determines that re-calibration is necessary, modifies the calibration environment and returns to step S101. Thus, the process for calibrating the camera shown in FIG. 101 is executed under the modified calibration environment modified at step S114 and subsequent processes according to the calibration verification method are executed.

As described above, the calibration verification method according to the first embodiment includes an image acquiring step (step S104), an overlay position calculation step (step S105), an overlay image generation step (steps S106 to S108) and a determination step (step S111). In the image acquiring step, the process acquires an image captured by the camera sensor 13 showing a state where verification targets 2 each including one or more markers C2 and C3 added to a portion at a predetermined height are arranged around the vehicle 10. In the overlay position calculation step, the process calculates the display positions of the required accuracy range R1 to R3 indicating the required accuracy of the camera corresponding to the positional information of the verification target 2, the height H2 and H3 of the marker C2 and the marker C3 of the verification target 2. In the overlay image generation step, the process generates an overlay image in which the required accuracy range R1 to R3 is overlayed on the captured image and causes the display device 14 to display the overlay image. In the confirming step, the process determines that the calibration result of the camera satisfies the required accuracy when the marker C2 and the marker C3 of the verification target 2 are displayed within the required accuracy range. The ECU 20 executes a program including the image acquiring step (step S104), the overlay position calculation step (step S105) and the overlay image generation step (step S106 to S108), thereby displaying the verification image on the display device 14.

According to the calibration verification method according to the first embodiment, as shown in step S102, the operator disposes the verification target 2 around the vehicle 10, the verification target 2 having the markers C2 and C3 positioned at the height H2 and H3 corresponding to the required accuracy which is set depending on the distance from the camera sensor 13. Thus, as shown in step S104, the camera sensor 13 is able to capture an image of a state where the verification target 2 is disposed. Then, the overlay image generated at step S106 is overlayed on the captured image acquired at step S104 to be displayed on the display device 14 as the verification image. According to the verification image displayed at step S108, in the case where the lowest portion, the marker C2 and the marker C3 of the verification target 2 are positioned in the corresponding required accuracy range R1, R2 and R3, it is determined that the calibration result of the camera sensor 13 satisfies the required accuracy range of the camera. Hence, the operator readily confirms the calibration result by visually observing the verification image displayed on the display device 14.

Further, even when the operator disposes the verification target 2 at an arbitrary position, with the process at step S103, the position of the verification target 2 may be measured by the radar sensor 12 or the measurement apparatus 1, thereby acquiring the measured position to be the positional information of the verification target 2. Since the measurement position of the verification target 2 accurately measured using the measurement apparatus can be utilized as the positional information of the target 2, a positional shift of the verification target 3 when being disposed can be avoided.

As a result, the display positions of the required accuracy range R1 to R3 calculated in the overlay position calculation process shown in step S105 can be prevented from being at an inappropriate position, and the calibration result when verifying the calibration of the camera sensor 13 can be prevented from being erroneously recognized.

Second Embodiment

Figure 8:
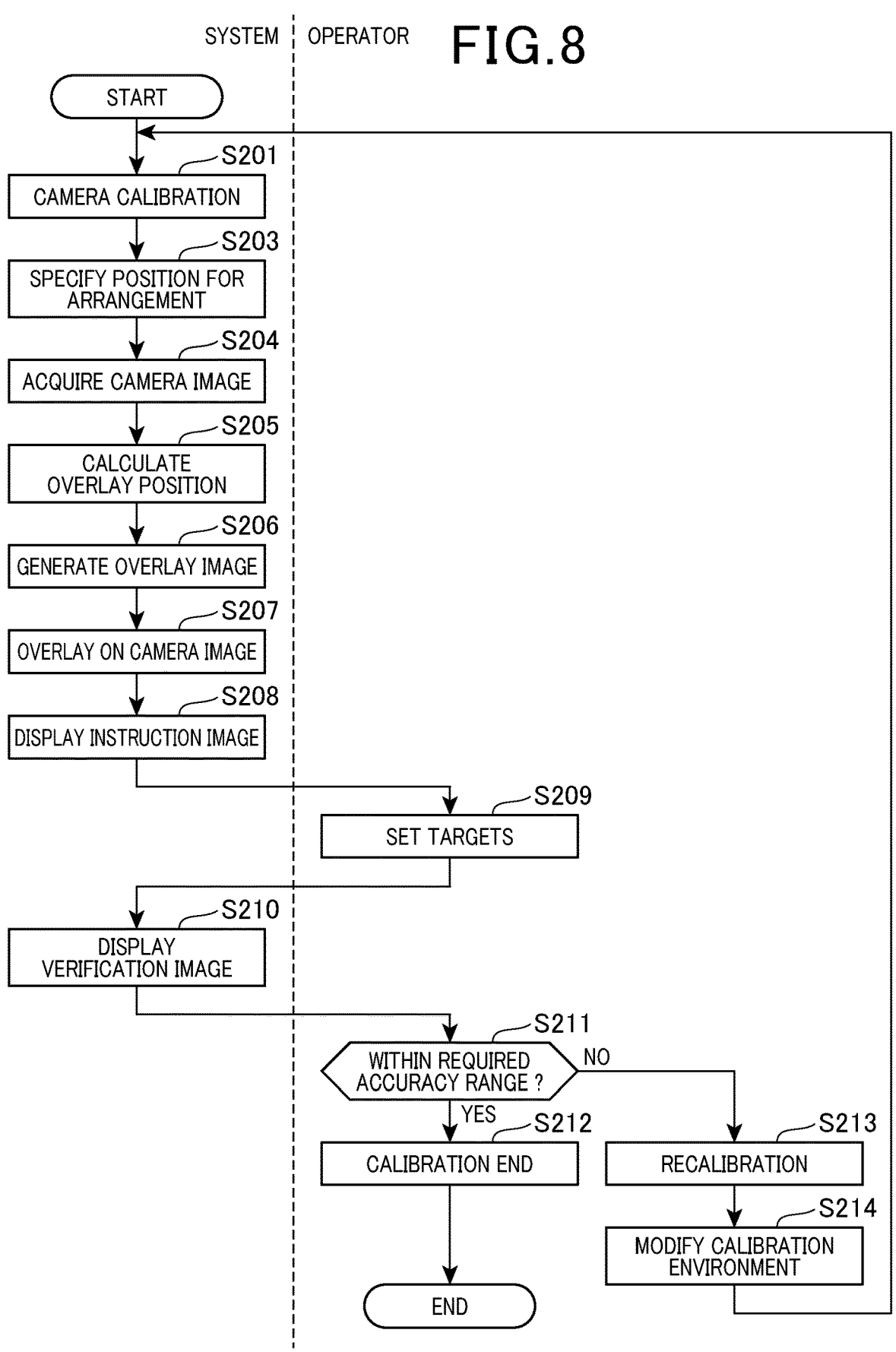
FIG. 8 is a flowchart showing a calibration verification method of a camera sensor according to the second embodiment.

FIG. 8 is a flowchart showing a calibration of the camera sensor 13 and a calibration verification method thereof according to a second embodiment. In FIG. 8, the left side with respect to the dotted line shows a process executed in the on-vehicle system side in the vehicle 10, and the right side thereof shows a process executed by an operator. The second embodiment differs from the first embodiment in that a drawing specified position, where the required accuracy range R1 to R3 is drawn, is calculated to generate the overlay image, thereafter, the verification target 2 is disposed at the drawing specified position to display the verification image.

At step S201, similar to step S101, with the on-vehicle system, the process of calibrating the camera sensor 13 is executed and proceeds to step S203.

At step S203, the process calculates the drawing specified position for drawing the required accuracy range R1 to R3 based on the camera parameter of the camera sensor 13. For example, positions that allow the verification target 2 to be appropriately arranged can be calculated as the drawing specified position based on a position where the camera 13 is mounted to the vehicle 10, and a camera parameter such as a direction of the optical axis of the camera sensor 13.

At subsequent step S204, a process for acquiring the camera image from the camera sensor 13 is executed. In the camera image to be acquired, the verification target 2 is not captured.

At step S205, the process calculates display positions of the required accuracy range R1 to R3. Similar to the step S105, the display positions of the required accuracy range R1 to R3 are calculated based on the position of the verification target 2 and the required accuracy of the camera sensor 13 corresponding to the height H2 and H3 of the markers C2 and C3. However, the process at step S205 differs from the step S105 in that the drawing specified position calculated at step S203 is used as the position of the verification target 2.

At step S206, the process generates an overlapped image where the display positions of the required accuracy range R1 to R3 calculated at step S205 are marked. At subsequent step S207, the process overlays the overlay image generated at step S206 on the camera image acquired at step S204. Thus, an instruction image is displayed on the display device 14 as shown step S208. Note that the instruction image refers to an image in which the overlay image is overlayed on the camera image having no verification target 2.

Figure 9:
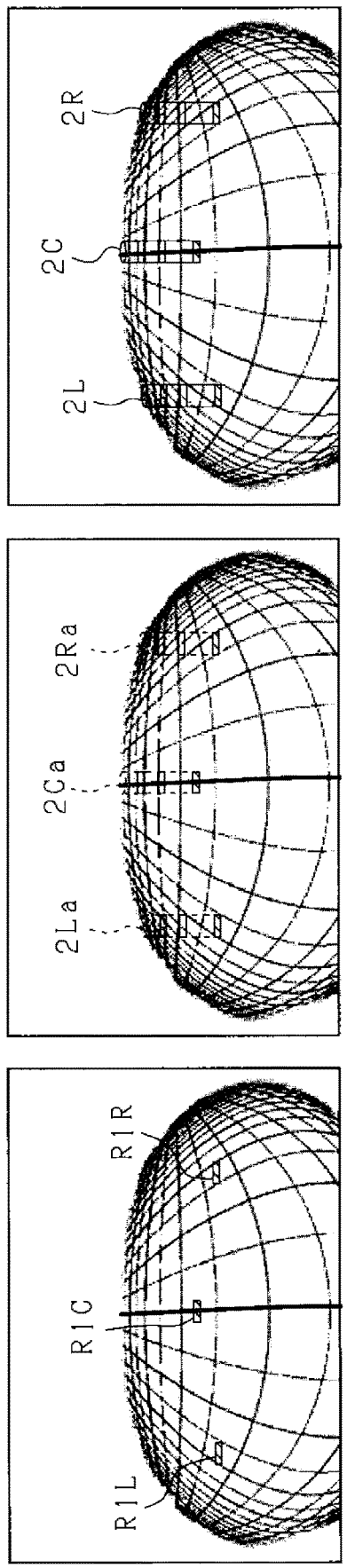
FIGS. 9A to 9C are diagrams briefly explaining a disposition of the verification target and a process for generating an overlay image according to a second embodiment.

For example, as shown in FIG. 9A, an image clearly showing the drawing specified positions R1L, R1C and R1R specified at step S203 can be generated. Note that the lattice shown in FIG. 9 indicates the coordinate in the camera image. Next, the process calculates, in the respective drawing specified positions R1L, R1C and R1R, the display positions of the required accuracy range R1 to R3 corresponding to the height 0, H2 and H3. Then, the calculated drawing specified positions R1 to R3 are clearly shown in the image, whereby the instruction image shown in FIG. 9B can be generated. The dotted lines 2La, 2Ca, 2Ra shown in FIG. 9B are indexes for arranging the verification target 2. Thereafter, the process proceeds to step S209.

At step S209, the operator disposes the verification targets 2 on the drawing specified positions R1L, R1C and R1R. The operator disposes the respective verification targets 2 to be within the dotted lines 2La, 2Ca and 2Ra while visually observing the instruction image, whereby the verification targets 2 can be accurately arranged at the drawing specified positions R1L, R1C and R1R. The verification targets 2L, 2C and 2R shown in FIG. 9C each shows a verification target 2 disposed in the drawing specified positions R1L, R1C and R1R. Note that one verification target is caused to sequentially move, whereby an individual image capturing a state where each verification target 2 is disposed in each of the three drawing specified positions R1L, R1C and R1R may be acquired. Alternatively, the three identical verification targets 2 may be prepared and arranged for three drawing specified positions R1L, R1C and R1R and the arranged three verification targets 2 may be captured at the same time to acquire a captured image.

With the arrangement of the verification targets 2 by the operator at step S208, as shown in step S210, an image is displayed on the display device 14 where the overlayed image is overlayed on the camera image including the captured verification target 2. In other words, the verification image is displayed on the display device 14.

Thereafter, at step S211, the operator visually observes the verification image displayed on the display device 14 so as to confirm whether the accuracy of the camera sensor 13 is within the required accuracy range. The processes shown in steps S211 to S214 are the similar to steps S111 to S114 shown in FIG. 7, the explanation thereof will be omitted.

According to the calibration verification method of the second embodiment. As shown in step S203, the process executes a drawing specified position calculation step that calculates the drawing specified positions for drawing the required accuracy range R1 to R3 based on the camera parameter of the camera sensor 13. In the overlay position calculation step shown in step S205, the process utilizes the drawing specified positions R1L, R1C and R1R calculated at step S203 to be the positional information of the verification target 2, thereby calculating the display positions of the required accuracy range R1 to R3. For the overlay image generation step, at steps S206 to S208, an overlay image is overlayed on a captured image where no verification target 2 is captured, and the instruction image is displayed on the display device 14. Thereafter, at step S209, the operator disposes the verification targets 2 on the drawing specified positions R1L, R1C and R1R while visually observing the instruction image displayed on the display device 14, whereby the verification image similar to the first embodiment is displayed on the display device 14 as shown in step S210. Hence, similar to the first embodiment, the operator visually observes the verification image displayed on the display device 14, whereby the operator can easily confirm the calibration result. Further, since the operator disposes the verification targets 2 to be within the dotted lines 2La, 2Ca, 2Ra which are indexes when positioning the verification target 2, the positional shift of the verification target 2 can be avoided. As a result, the display positions of the required accuracy range R1 to R3 can be prevented from being at inappropriate positions, and the erroneous recognition of the calibration result when verifying the calibration result of the camera 13 can be suppressed.

Third Embodiment

Figure 10:
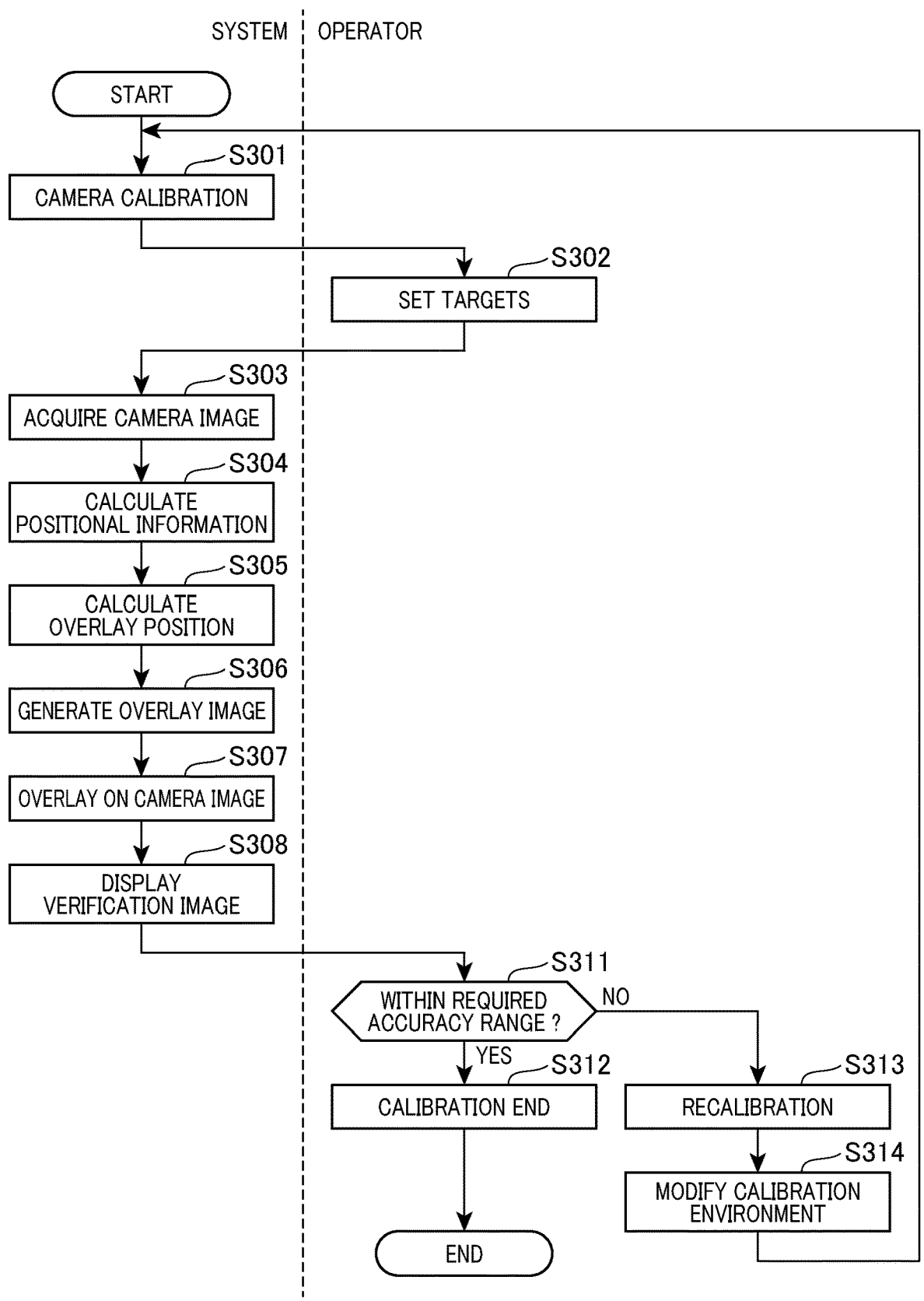
FIG. 10 is a flowchart showing a calibration verification method of a camera according to a third embodiment.

FIG. 10 is a flowchart showing a calibration of the camera sensor 13 and a calibration verification method thereof according to a third embodiment. In FIG. 10, the left side with respect to the dotted line shows a process executed in the on-vehicle system side in the vehicle 10, and the right side thereof shows a process executed by an operator. The third embodiment differs from the first embodiment in that a measurement position which is a position of the verification target 2 is calculated based on the measurement data of the camera sensor 13, the positional information acquiring unit 21 acquires the calculated measurement position to be the positional information of the verification target 2.

At step S301, similar to step S101, the on-vehicle system executes a process for calibrating the camera sensor 13 and proceeds to step S302. At step S302, the operator disposed the verification target 2. According to the present embodiment, the operator disposes the verification target 2 to be arbitrary position.

Figure 11:
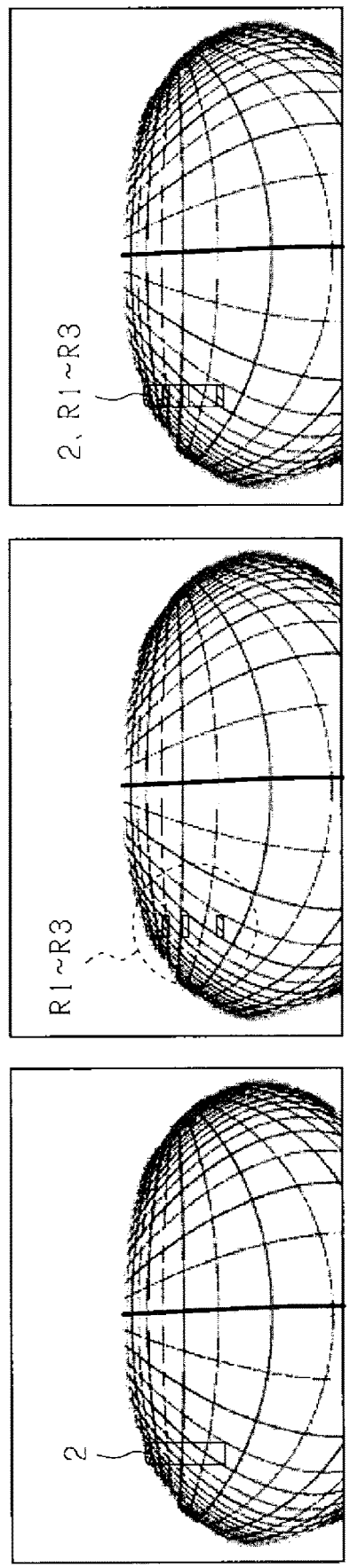
FIGS. 11A to C are diagrams briefly explaining a disposition of the verification target and a process for generating an overlay image according to a third embodiment.

At step S303, similar to step S104, a process for acquiring the camera image from the camera sensor 13 is executed. Thus, as shown in FIG. 11A, an image is acquired where the verification target 2 disposed at an arbitrary position is captured. Thereafter, the process proceeds to step S304. At step S304, the process calculates, based on the image information acquired from the camera sensor 13, the measurement position as a position of the verification target 2 measured by the camera sensor 13, and acquires the measurement position to be the positional information of the verification target. Thereafter, the process proceeds to step S305.

At step S305, the process calculates the required accuracy range R1 to R3. The display positions of the required accuracy range R1 to R3 are calculated, similar to step S105, in accordance with the position of the verification target 2 and the required accuracy of the camera sensor 13 corresponding to the height of the markings C2 and C3. However, the process at step S305 utilizes the positional information of the verification target 2 calculated based on the captured image which is calculated at step 304. This is different from the process at step S105.

At step S306, the process generates an overlap image in which the display positions of the required accuracy range R1 to R3 calculated at step S305 are marked. After executing step S306, the process proceeds to step S307. The processes shown in steps S307 to S314 are similar to those in steps S107 to S114 shown in FIG. 7, the explanation thereof will be omitted.

According to the calibration verification method of the third embodiment, as shown in steps S303 and S304, the measurement position of the verification target 2 measured by the camera sensor 13 is acquired as the positional information. At the overlay position calculation step shown in step S305, the process calculates the display position of the required accuracy range using the measured positional information acquired at step S304 as the positional information of the verification target 2. Thereafter, with the overlay image generation step shown in steps S306 to S308, the verification image similar to the first embodiment is displayed on the display device 14. Hence, similar to the first embodiment, the operator visually observes the verification image displayed on the display device, whereby the operator can easily confirm the calibration result.

Further, even when the operator disposes the verification target 2 at an arbitrary position, with the process at step S304, the position at which the verification target 2 is disposed is measured by the camera sensor 13. Hence, the measured position can be acquired as positional information of the verification target 2. As the positional information of the verification target 2, since the measurement position which is accurately measured using the camera sensor 13 can be utilized, the positional shift can be suppressed at position where the verification target 2 is disposed. Hence, the display positions of the required accuracy range R1 to R3 can be prevented from being at an inappropriate position, and further, the erroneous recognition of the calibration result when verifying the calibration result of the camera 13 can be suppressed.

Since the positional information of the verification target 2 can be acquired by the camera sensor 13, the vehicle 10 may be configured not to include an on-vehicle sensor (e.g. radar sensor 12 or the like) other than the camera sensor 13 for acquiring the positional information of the verification target 2. On the other hand, both of the radar sensor 12 and the camera sensor 13 may be used to acquire the positional information of the verification target 2. A plurality of measurement apparatuses are used to acquire the positional information of the verification target 2, whereby the accuracy of the positional information can be improved.

Fourth Embodiment

Figure 12:
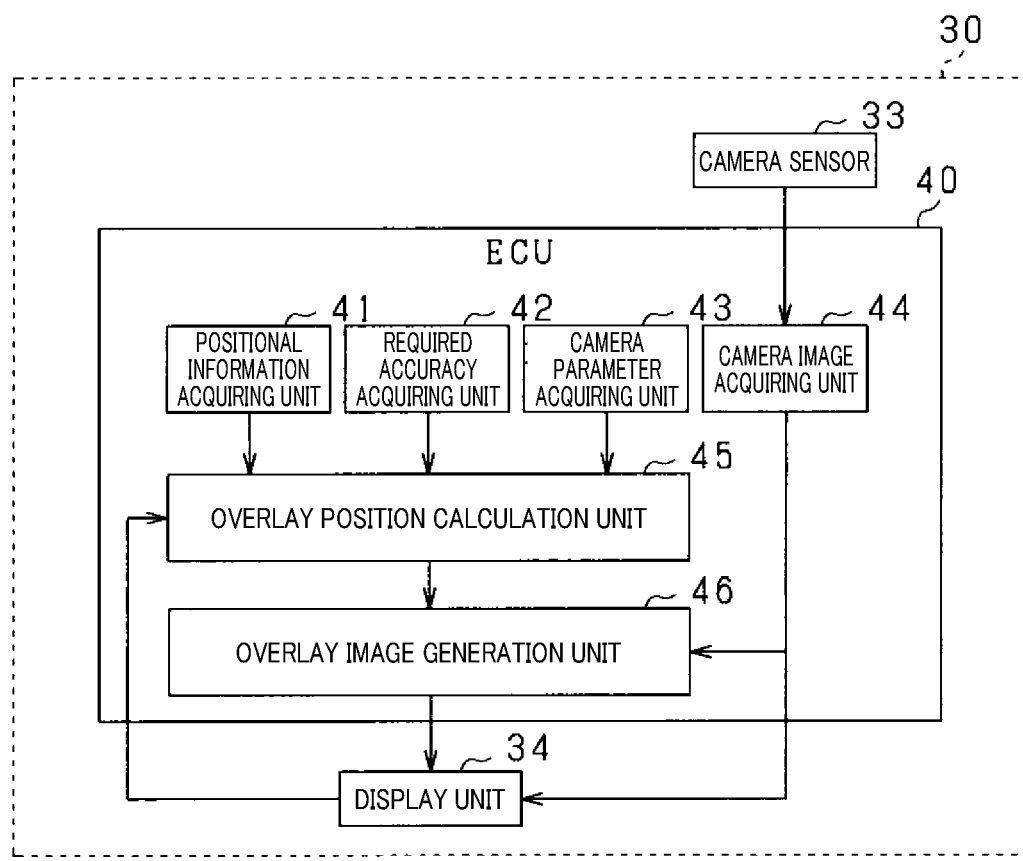
FIG. 12 is a block diagram showing a configuration of a calibration verification apparatus according to a fourth embodiment.

FIG. 12 shows a vehicle 30 provided with an ECU 40 serving as a calibration verification apparatus according to fourth embodiment. The vehicle 30 is provided with a camera sensor 33, an ECU 40 and a display apparatus 34. The ECU 40 is provided with a positional information acquiring unit 41, a required accuracy acquiring unit 42, a camera parameter acquiring unit 43, a camera image acquiring unit 44, an overlay position calculation unit 45 and an overlay image generation unit 46. A captured image acquired by the camera image acquiring unit 44 from the camera sensor 33 is outputted to the overlay image generation unit 46 and the display unit 34. The display unit 34 is provided with an interface with which the operator inputs an operation command. The operator is able to input positional information of the verification target 2 to the display device 34. The positional information of the verification target 2 inputted to the display device 14 is outputted to the overlay position calculation unit 45. The overlay position calculation unit 45 is configured to be capable of calculating a display position of the required accuracy range indicating the required accuracy of the camera corresponding to the marker height, based on the positional information of the verification target 2 outputted by the display device 34 and the required accuracy outputted by the required accuracy acquiring unit 22. Since the respective configurations shown in FIG. 12 are the same as those shown in FIG. 1 except the above-described items, reference numbers 10s and 20s in FIG. 1 are replaced by the reference number 30s and 40s shown in FIG. 12, respectively, and the explanation thereof is omitted.

Figure 13:
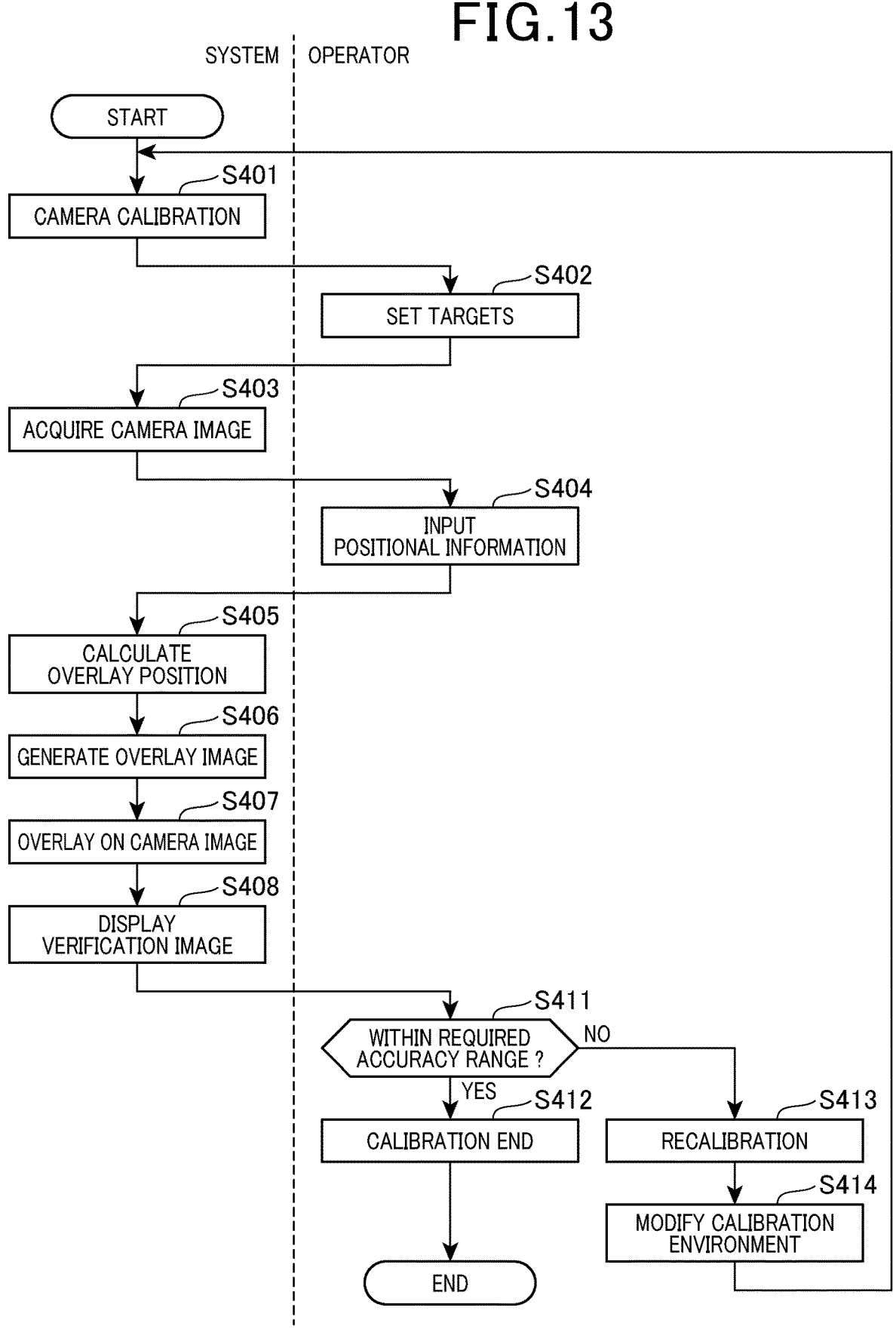
FIG. 13 is a flowchart showing a calibration verification method of a camera according to a fourth embodiment.

FIG. 13 shows a flowchart of a calibration of a camera sensor 13 and a calibration verification method thereof. In FIG. 13, the left side with respect to the dotted line shows a process executed in the on-vehicle system side in the vehicle 10, and the right side thereof shows a process executed by an operator.

At step S401, similar to step S101, the on-vehicle system executes a process for calibrating the camera sensor 13 and proceeds to step S402. At step S402, the operator disposes the verification target 2. According to the present embodiment, the operation disposes the verification target 2 at an arbitrary position.

At step S403, similar to step S104, a process for acquiring the camera image from the camera sensor 13. Thus, an image is acquired where the verification target 2 disposed at an arbitrary position is captured. Thereafter, the process proceeds to step S404.

Figure 14:
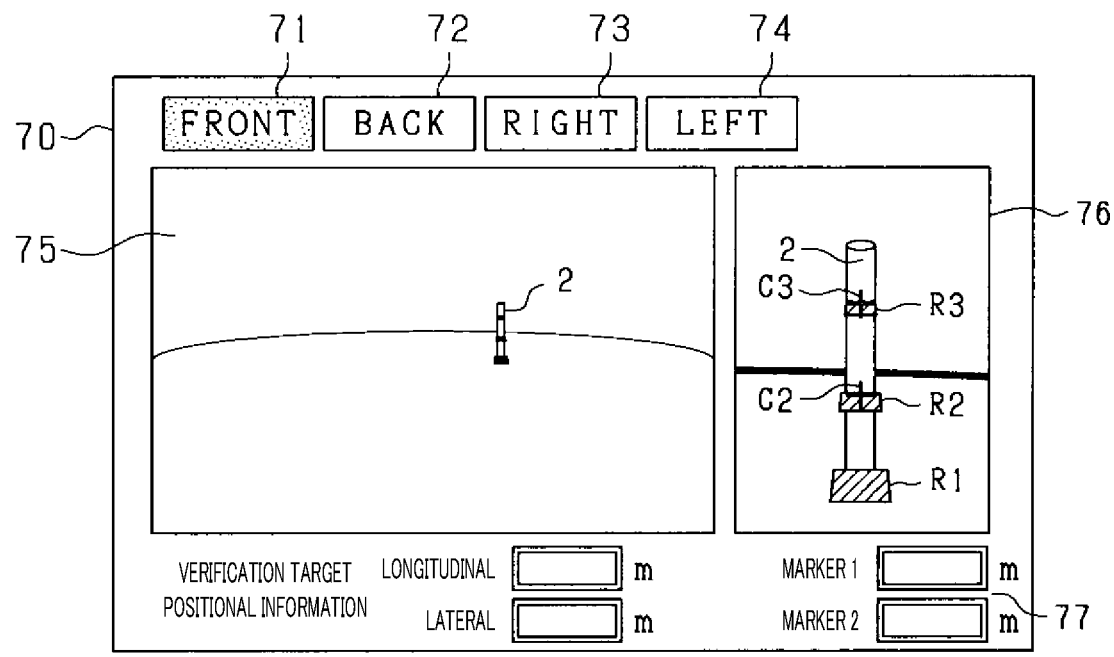
FIG. 14 is a diagram showing a display unit on which a verification image according to a fourth embodiment is displayed.

At step S404, the operator inputs the positional information of the verification target 2 on the display device 34. As shown in FIG. 14, the display device 34 is provided with an input unit 77 as a touch panel on the lower part of the display screen 70 to which the operator inputs an instruction command on the touch panel. The input unit 77 is configured to receive the positional information of the verification target 2 (i.e. position with respect to longitudinal direction or lateral direction) or the height information of a marker of the verification target 2. Note that respective displays 71 to 76 are the same as the respective displays 61 to 66 shown in FIG. 6. Thereafter, the process proceeds to step S405.

At step S405, the process calculates the display positions of the required accuracy range R1 to R3. The display positions of the required accuracy range R1 to R3 are calculated in accordance with, similar to step S105, the position of the verification target 2 and the required accuracy of the camera sensor 13 corresponding to the height of the markings C2 and C3. However, step S405 differs from step S105 in that the process at step S405 uses the positional information of the verification target 2 inputted by the operator from the display device 34 at step S404.

At step S406, the process generates an overlay image where the display positions of the required accuracy range R1 to R3 calculated at step S405. After executing the process at step S406, the process proceeds to step S407. Since the processes at steps S407 to S414 are similar to those in steps S107 and S114 shown in FIG. 7, the explanation thereof will be omitted.

According to the calibration verification method of the fourth embodiment, as shown in step S404, the operator inputs the positional information of the verification target 2 from the display device 34. In the overlay position calculation step shown in S405, with the positional information of the verification target 2 inputted at step S404, the display position of the required accuracy range. Thereafter, with the overlay image generation step shown in steps S406 to S408, the verification image similar to the first embodiment can be displayed. Hence, similar to the first embodiment, the operator visually observes the verification image displayed on the display device 14, whereby the operator can easily confirm the calibration result.

According to the calibration verification method of the fourth embodiment, since the positional information of the verification target 2 can be acquired by the operator input, the method may be applied to a case where the vehicle 10 is not provided with an on-vehicle sensor (e.g. radar sensor 12) for acquiring the positional information of the verification target 2.

Fifth Embodiment

According to the fifth embodiment, unlike the first embodiment, as shown in FIG. 5, the position of the verification target 2 and the position of the marker are displayed on the display device 14 using a continuous positional display W, which concentrically display with the camera sensor 13 as the center thereof when viewing the vehicle 10 as birds eye view.

Figure 15:
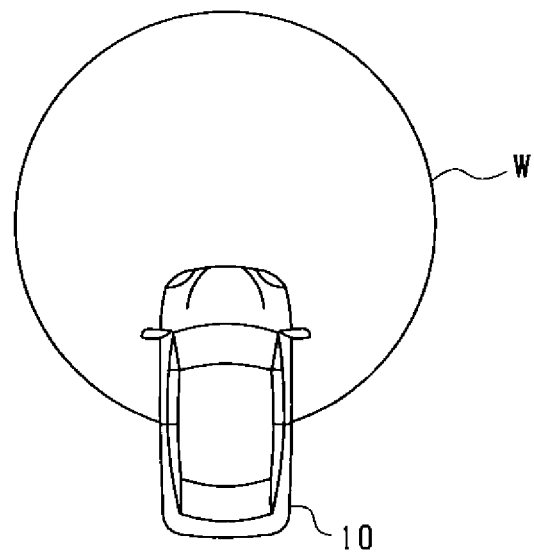
FIG. 15 is a diagram showing a required accuracy range of a verification image according to a fifth embodiment.
Figure 16:
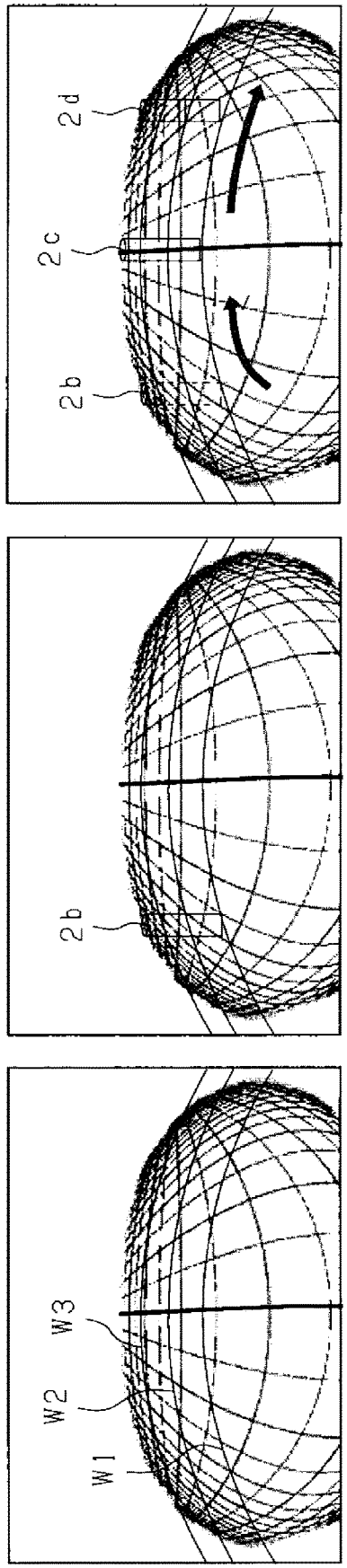
FIGS. 16A to 16C are diagrams briefly explaining a disposition of the verification target and a process for generating an overlay image according to a fifth embodiment.

Specifically, as shown in FIG. 16A, a continuous positional display W1 indicating a position of the verification target 2, a continuous positional display W2 indicating the position of the marker C2 of the verification target 2, and a continuous positional display W3 indicating the position of the marker C3 of the verification target C3 are shown in a display screen of the verification target 2. The continuous positional displays W1 to W3 are formed in a concentrical shape similar to the continuous positional display W shown in FIG. 15. As shown in FIG. 16B, for the verification target 2b, the operator is able to dispose the verification target at an arbitrary position along the continuous positional displays W1 to W3 while visually observing the display screen of the display device 14. As shown in FIG. 16C, the position of the verification target 2 is subsequently moved to the positions of the verification targets 2c and 2d from the verification target position 2b, and an image capturing a state where the verification target 2 is disposed at each of the verification targets 2b, 2c and 2d may be separately acquired. Alternatively, the same three verification targets 2 are prepared and disposed at positions corresponding to the verification targets 2b, 2c and 2, and an image simultaneously capturing the three verification targets 2 disposed at the corresponding positions may be acquired.

Figure 17:
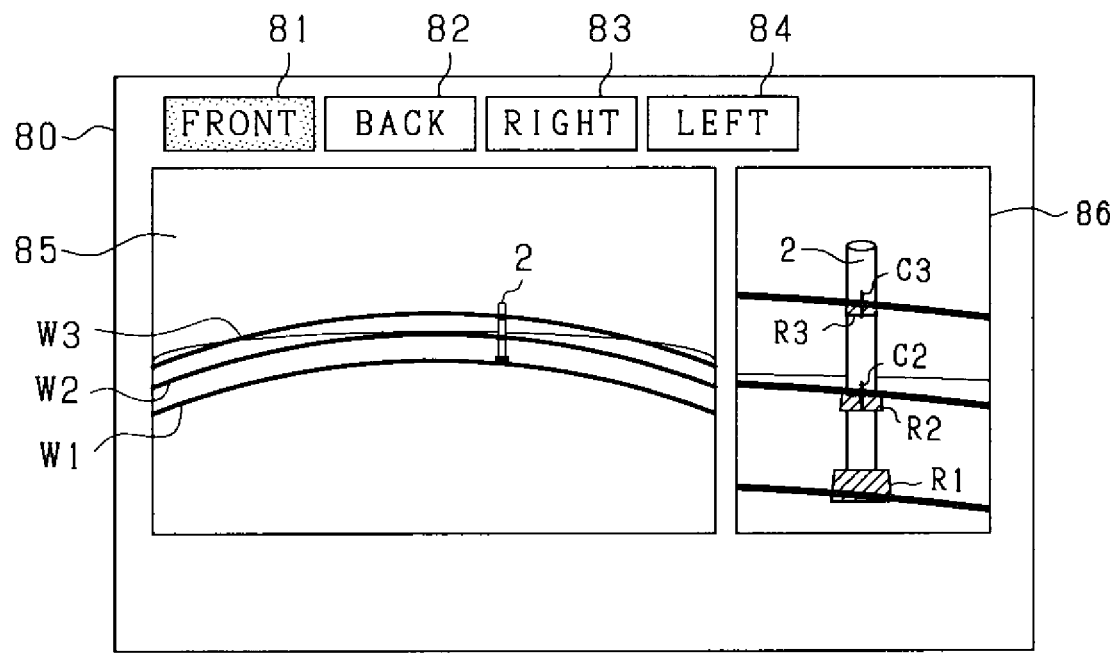
FIG. 17 is a diagram showing a display unit on which a verification image according to a fifth embodiment is displayed.

FIG. 17 shows a display screen 80 of the display device 14 on which the continuous positional displays W1 to W3. The verification image display 85 and the expanded image display 86 differs from the verification image display 65 and the expanded image display 66 shown in FIG. 6 in that the continuous positional displays W1 to W3 are displayed. In the verification image displayed on the verification image display 85 and the expanded image display 86, continuous positional display displays W1 to W3 indicating the position of the verification target 2 are drawn in a substantially circular shape of which the center is the camera sensor 13. Note that the respective displays 81 to 84 are similar to the respective displays 61 to 64 shown in FIG. 6.

According to the above-described respective embodiments, a case is exemplified where the operator visually observes the verification image to confirm the calibration result. However, the ECU 20, 40 may determine whether the lowest portion, the marker C2 and the marker C3 of the verification target 2 are all positioned in the corresponding required accuracy range R1, R2 and R3, and may determine whether the calibration result of the camera sensor 13 satisfies the required accuracy of the camera. The calibration verification program executed by the ECU 20, 40 may include a determination step for determining that the calibration result of the camera sensor 13 satisfies the required accuracy of the camera when the markers C2 and C3 of the verification target 2 are displayed within the required accuracy range R1 to R3. Further, the ECU 20 and 40 may be provided with a determining unit for determining that the calibration result of the camera sensor 13 satisfies the required accuracy of the camera. According to the above-described respective embodiments, a case is exemplified where the operator disposes the verification target 2. However, the ECU 20, 40 may command an apparatus or the like to move the verification target 2, thereby positioning the verification target 2.

According to the above-described embodiments, the following effects and advantages can be obtained.

The calibration verification method for verifying the calibration result of the camera sensor 13 mounted to the vehicle 10 includes an image acquiring step (S103, S204, S303, S403), an overlay position calculation step (S105, S205, S305, S405), an overlay image generation step (S106 to S108, S206 to S208, S210, S306 to S308, S406 to S408) and a determination step (S111, S211, S311, S411).

The image acquiring step acquires an image captured by the camera sensor 13 showing a state where verification targets 2 each including one or more markers C2 and C3 added to a portion thereof at a predetermined height are arranged around the vehicle 10. In the overlay position calculation step, the process calculates, based on the positional information of the verification target 2 and the required accuracy of the camera sensor 13, the display positions of the required accuracy range R1 to R3 indicating the required accuracy of the camera sensor 13 corresponding to the height H2 and H3 of the marker C2 and the marker C3. In the overlay image generation step, the process generates an overlay image indicating the display position of the required accuracy range R1 to R3 and displays a verification image on the display device 14, 34, where the overlay image is overlayed on the captured image. In the determination step, the process determines that the calibration result of the camera sensor 13 satisfies the required accuracy of the camera when the markers C2 and C3 of the verification target 2 in the verification image is displayed within the required accuracy range R1 to R3.

According to the above-described calibration verification method, the camera sensor 13 captures an image showing a state where verification targets 2 each including one or more markers C2 and C3 added to a portion thereof at a predetermined height are arranged around the vehicle 10, an overlay image including the required accuracy range R1 to R3 is overlayed on the captured image and displayed on the display device 14 and 34 as a verification image. According to this verification image, in the case where the markers C2 and C3 of the verification target 2 are displayed within the required accuracy range R1 to R3, it can be determined that the calibration result of the camera sensor 13 satisfies the required accuracy of the camera sensor 13. Hence, the operator readily confirms the calibration result by visually observing the verification image displayed on the display device 14, 34. Further, since the display positions of the required accuracy range R1 to R3 are calculated based on the positional information of the verification target 2 and the display position of the required accuracy range can be prevented from being at an inappropriate position due to the positional shift of the verification target 2, the calibration result when verifying the calibration of the camera sensor 13 can be prevented from being erroneously recognized.

The above-described calibration verification method may further include a positional information acquiring step (S103, S304, S404) that acquires the positional information of the verification target 2. In this case, the overlay position calculation step may be configured to calculate the display position of the required accuracy range R1 to R3 based on the positional information of the verification target 2 acquired at the positional information acquiring step.

The positional information acquiring step may be configured to acquire the positional information of the verification target 2 measured by a predetermined measurement apparatus (e.g. a measurement apparatus 1, a radar sensor 12, a camera sensor 13). Since the measurement position of the verification target 2 accurately measured using the measurement apparatus can be utilized as the positional information of the verification target 2, positional shift of the verification target 2 can be avoided. In the case where the camera sensor 13 mounted to the vehicle 10 is used as the measurement apparatus, the calibration verification method may be applied to a vehicle without on-vehicle sensors (e.g. radar sensor 12 or the like) capable of acquiring the positional information of the verification target 2 other than the camera sensor 12.

The positional information acquiring step may be configured to acquire a position at which the verification target 2 is disposed, inputted via the display device 34, to be the positional information of the verification target. Since the positional information of the verification target 2 can be acquired with an operator's input, the calibration verification method may be applied to a vehicle 10 without on-vehicle sensors (e.g. radar sensor 12 or the like) capable of acquiring the positional information of the verification target 2

The above-described calibration verification method may further include a drawing specified position calculation step (S203) that calculates drawing specified positions for drawing the required accuracy range R1 to R3 based on the camera parameter of the camera sensor 13. In this case, the overlay position calculation step may be configured to calculate the display positions of the required accuracy range R1 to R3 using the drawing specified position calculated at the drawing specified position calculation step as the positional information of the verification target 2.

In the above-described calibration verification method, the position of the verification target 2 may be drawn in a substantially circular shape of which the center is the camera sensor 13. The operator is able to dispose the verification target 2 at an arbitrary position along the continuous positional displays W1 to W3 while visually observing the display screen of the display device 14. Since the operator disposes the verification target 2 at an appropriate position while visually observing an image where an overlay image is overlayed on the camera image, a positional shift of the verification target 3 when being disposed can be avoided.

The above-described calibration verification method is achieved by executing the following calibration verification program with the ECU 20, 40. The calibration verification program includes an image acquiring step, an overlay position calculation step and an overlay image generation step, and may further include a positional information acquiring step and a drawing specified position calculation step.

The above-described calibration verification method can be accomplished by ECU 20, 40 serving as a calibration verification apparatus. The ECU 20, 40 is provided with a camera image acquiring unit 24, 44, an overlay position calculation unit 25, 45, and an overlay image generation unit, and may further include a positional information acquiring unit 21, 41, a required accuracy acquiring unit, a camera parameter acquiring unit 23, 43.

The camera image acquiring unit 24, 44 acquires an image captured by the camera sensor 13, 33, capturing a state where the verification targets 2 each having one or more markers C2 and C3 added to a portion at a predetermined height are arranged around the vehicle 10. The overlay position calculation unit 25, 45 calculates, based on the positional information of the verification target 2 and the required accuracy of the camera sensor 13, 33, the display positions of the required accuracy range R1 to R3 indicating the required accuracy of the camera sensors 13, 33 corresponding to the height H2 and H3 of the markers C2 and C3. The overlay image generation unit 26, 46 generates the overlay image indicating the required accuracy range R1 to R3 and causes the verification image where the overlay image is overlayed on the captured image to be displayed on the display device 14, 34.

The control unit and method thereof disclosed in the present disclosure may be accomplished by a dedicated computer constituted of a processor and a memory programmed to execute one or more functions embodied by computer programs. Alternatively, the control unit and method thereof disclosed in the present disclosure may be accomplished by a dedicated computer provided by a processor configured of one or more dedicated hardware logic circuits. Further, the control unit and method thereof disclosed in the present disclosure may be accomplished by one or more dedicated computer where a processor and a memory programmed to execute one or more functions, and a processor configured of one or more hardware logic circuits are combined. Furthermore, the computer programs may be stored, as instruction codes executed by the computer, into a computer readable non-transitory tangible recording media.

Hereinafter, significant configurations extracted from the above-described respective embodiments will be described.

[Configuration 1]

A calibration verification method for verifying a calibration result of a camera mounted to a vehicle, comprising steps of: an image acquiring step for acquiring an image captured by a camera, the image showing a state where verification targets each including one or more markers added to a portion thereof at a predetermined height are arranged around the vehicle; an overlay position calculation step for calculating a display position of a required accuracy range based on positional information of the verification target and a required accuracy of the camera, the required accuracy range indicating a required accuracy of the camera corresponding to a height of the marker; an overlay image generation step for generating an overlay image indicating a display position of the required accuracy range, and causing a display device to display a verification image where the overlay image is overlaid on the image captured by the camera; and a determination step for determining that the calibration result of the camera satisfies the required accuracy of the camera when the marker of the verification target is displayed within the required accuracy range in the verification image.

[Configuration 2]

The calibration verification method according to configuration 1 further comprising a positional information acquiring step for acquiring positional information of the verification target; and the overlay position calculation step calculates a display position of the required accuracy range based on the positional information of the verification target acquired in the positional information acquiring step.

[Configuration 3]

The calibration verification method according to configuration 2, wherein the positional information acquiring step acquires positional information of the verification target measured by a predetermined measurement apparatus.

[Configuration 4]

The calibration verification method according to configuration 3, wherein the measurement apparatus is a camera mounted to the vehicle.

[Configuration 5]

The calibration verification method according to configuration 2, wherein the positional information acquiring step acquires a position at which the verification target is disposed, inputted via the display device, to be the positional information of the verification target.

[Configuration 6]

The calibration verification method according to any one of configurations 1 to 5 further comprising a drawing specified position calculation step that calculates, based on a camera parameter of the camera, a drawing specified position for drawing the required accuracy range; and the overlay position calculation step calculates a display position of the required accuracy range using the drawing specified position calculated at the drawing specified position calculation step as the positional information of the verification target.

[Configuration 7]

The calibration verification method according to any one of configurations 1 to 6, wherein
in the verification image, position of the verification target is drawn in a substantially circular shape of which the center is the camera.

[Configuration 8]

A calibration verification program for displaying a verification image on a display device for verifying a calibration result of a camera mounted to a vehicle, causing a computer to execute:
an image acquiring step for acquiring an image captured by a camera, the image showing a state where verification targets each including one or more markers added to a portion thereof at a predetermined height are arranged around the vehicle; an overlay position calculation step for calculating a display position of a required accuracy range based on positional information of the verification target and a required accuracy of the camera, the required accuracy range indicating a required accuracy of the camera corresponding to a height of the marker; and an overlay image generation step for generating an overlay image indicating a display position of the required accuracy range, and causing a display device to display the overlay image.

[Configuration 9]

A calibration verification apparatus for displaying a verification image on a display device for verifying a calibration result of a camera mounted to a vehicle, the calibration verification apparatus comprising: an image acquiring unit that acquires an image captured by a camera, the image showing a state where verification targets each including one or more markers added to a portion thereof at a predetermined height are arranged around the vehicle; an overlay position calculation unit for calculating a display position of a required accuracy range based on positional information of the verification target and a required accuracy of the camera, the required accuracy range indicating a required accuracy of the camera corresponding to a height of the marker; and an overlay image generation unit for generating an overlay image indicating a display position of the required accuracy range, and causing a display device to display a verification image where the overlay image is overlaid on the image captured by the camera.

CONCLUSION

In the light of the above-described circumstances, the present disclosure provides a technique capable of suppressing an erroneous recognition of the calibration result when verifying a camera calibration result.

The present disclosure provides a calibration verification method for verifying a calibration result of a camera mounted to a vehicle.

The calibration verification method for verifying a calibration result of a camera mounted to a vehicle includes steps of: an image acquiring step for acquiring an image captured by a camera, the image showing a state where verification targets each including one or more markers added to a portion thereof at a predetermined height are arranged around the vehicle; an overlay position calculation step for calculating a display position of a required accuracy range based on positional information of the verification target and a required accuracy of the camera, the required accuracy range indicating a required accuracy of the camera corresponding to a height of the marker; an overlay image generation step for generating an overlay image indicating a display position of the required accuracy range, and causing a display device to display a verification image where the overlay image is overlaid on the image captured by the camera; and a determination step for determining that the calibration result of the camera satisfies the required accuracy of the camera when the marker of the verification target is displayed within the required accuracy range in the verification image.

According to the above-described calibration verification method, the camera captures an image showing a state where verification targets each including one or more markers added to a portion thereof at a predetermined height are arranged around the vehicle, and an overlay image is overlayed on the captured image, whereby the overlayed image can be displayed on the display device as a verification image. With this verification image, it is determined that the calibration result satisfies the required accuracy of the camera. Hence, the operator visually observes the verification image displayed on the display device, thereby easily verifying the calibration result. Further, the display position of the required accuracy range is calculated based on the positional information of the verification target, and the display position of the required accuracy range can be prevented from being at an inappropriate position due to the positional shift of the verification target. Accordingly, the calibration result when verifying the calibration of the camera can be prevented from being erroneously recognized.

Moreover, the present disclosure provides a calibration verification program and apparatus for displaying a verification image on a display device for verifying a calibration result of a camera mounted to a vehicle.

A calibration verification program includes: an image acquiring step for acquiring an image captured by a camera, the image showing a state where verification targets each including one or more markers added to a portion thereof at a predetermined height are arranged around the vehicle; an overlay position calculation step for calculating a display position of a required accuracy range based on positional information of the verification target and a required accuracy of the camera, the required accuracy range indicating a required accuracy of the camera corresponding to a height of the marker; and an overlay image generation step for generating an overlay image indicating a display position of the required accuracy range, and causing a display device to display the overlay image.

The calibration verification apparatus includes: an image acquiring unit that acquires an image captured by a camera, the image showing a state where verification targets each including one or more markers added to a portion thereof at a predetermined height are arranged around the vehicle; an overlay position calculation unit for calculating a display position of a required accuracy range based on positional information of the verification target and a required accuracy of the camera, the required accuracy range indicating a required accuracy of the camera corresponding to a height of the marker; and an overlay image generation unit for generating an overlay image indicating a display position of the required accuracy range, and causing a display device to display a verification image where the overlay image is overlaid on the image captured by the camera.

The above-described calibration verification program and the calibration verification apparatus cause the verification image to be displayed on the display device, whereby the operator is able to easily determine whether the markers of the verification targets are displayed within the required accuracy range. Hence, a determination whether the calibration result of the camera satisfies the required accuracy of the camera can readily be made. Further, since the display position of the required accuracy range is calculated based on the positional information of the verification target, an erroneous recognition of the calibration result when verifying a camera calibration result can be suppressed.

What is claimed is:

1. A calibration verification method for verifying a calibration result of a camera mounted to a vehicle, comprising steps of:
    an image acquiring step for acquiring an image captured by a camera, the image showing a state where verification targets each including one or more markers added to a portion thereof at a predetermined height are arranged around the vehicle;
    an overlay position calculation step for calculating a display position of a required accuracy range based on positional information of the verification target and a required accuracy of the camera, the required accuracy range indicating a required accuracy of the camera corresponding to a height of the marker;
    an overlay image generation step for generating an overlay image indicating a display position of the required accuracy range, and causing a display device to display a verification image where the overlay image is overlaid on the image captured by the camera; and
    a determination step for determining that the calibration result of the camera satisfies the required accuracy of the camera when the marker of the verification target is displayed within the required accuracy range in the verification image.

2. The calibration verification method according to claim 1 further comprising a positional information acquiring step for acquiring positional information of the verification target; and
    the overlay position calculation step calculates a display position of the required accuracy range based on the positional information of the verification target acquired in the positional information acquiring step.

3. The calibration verification method according to claim 2, wherein
    the positional information acquiring step acquires positional information of the verification target measured by a predetermined measurement apparatus.

4. The calibration verification method according to claim 3, wherein
    the measurement apparatus is a camera mounted to the vehicle.

5. The calibration verification method according to claim 2, wherein the positional information acquiring step acquires a position at which the verification target is disposed, inputted via the display device, to be the positional information of the verification target.

6. The calibration verification method according to claim 1 further comprising a drawing specified position calculation step that calculates, based on a camera parameter of the camera, a drawing specified position for drawing the required accuracy range; and the overlay position calculation step calculates a display position of the required accuracy range using the drawing specified position calculated at the drawing specified position calculation step as the positional information of the verification target.

7. The calibration verification method according to claim 1, wherein in the verification image, position of the verification target is drawn in a substantially circular shape of which the center is the camera.

8. A calibration verification program for displaying a verification image on a display device for verifying a calibration result of a camera mounted to a vehicle, causing a computer to execute:

an image acquiring step for acquiring an image captured by a camera, the image showing a state where verification targets each including one or more markers added to a portion thereof at a predetermined height are arranged around the vehicle;

an overlay position calculation step for calculating a display position of a required accuracy range based on positional information of the verification target and a required accuracy of the camera, the required accuracy range indicating a required accuracy of the camera corresponding to a height of the marker; and an overlay image generation step for generating an overlay image indicating a display position of the required accuracy range, and causing a display device to display the overlay image.

9. A calibration verification apparatus for displaying a verification image on a display device for verifying a calibration result of a camera mounted to a vehicle, the calibration verification apparatus comprising:

an image acquiring unit that acquires an image captured by a camera, the image showing a state where verification targets each including one or more markers added to a portion thereof at a predetermined height are arranged around the vehicle;

an overlay position calculation unit for calculating a display position of a required accuracy range based on positional information of the verification target and a required accuracy of the camera, the required accuracy range indicating a required accuracy of the camera corresponding to a height of the marker; and an overlay image generation unit for generating an overlay image indicating a display position of the required accuracy range, and causing a display device to display a verification image where the overlay image is overlaid on the image captured by the camera.

* * * * *